(12) United States Patent
Hu et al.

(10) Patent No.: US 9,304,325 B2
(45) Date of Patent: Apr. 5, 2016

(54) LENS DRIVING DEVICE WITH AN IMPROVED OIS COIL STRUCTURE

(71) Applicant: TDK TAIWAN CORP., Yangmei (TW)

(72) Inventors: Chao-Chang Hu, Yangmei (TW); Fu-Yuan Wu, Yangmei (TW); Shih-Ting Huang, Yangmei (TW); Jyun-Jie Lin, Yangmei (TW); Yi-Ho Chen, Yangmei (TW)

(73) Assignee: TDK TAIWAN CORP., Yangmei (TW)

( * ) Notice: Subject to any disclaimer, the term of this patent is extended or adjusted under 35 U.S.C. 154(b) by 0 days.

(21) Appl. No.: 14/305,688

(22) Filed: Jun. 16, 2014

(65) Prior Publication Data
US 2014/0368936 A1 Dec. 18, 2014

Related U.S. Application Data

(60) Provisional application No. 61/836,038, filed on Jun. 17, 2013.

(51) Int. Cl.
*G02B 7/02* (2006.01)
*G02B 27/64* (2006.01)
*G02B 7/09* (2006.01)
*G02B 7/08* (2006.01)

(52) U.S. Cl.
CPC ............... *G02B 27/646* (2013.01); *G02B 7/08* (2013.01); *G02B 7/09* (2013.01)

(58) Field of Classification Search
CPC ........................................................ G02B 7/09
USPC ........................................................ 359/824
See application file for complete search history.

(56) References Cited

U.S. PATENT DOCUMENTS

2013/0163085 A1* 6/2013 Lim et al. ...................... 359/557

* cited by examiner

*Primary Examiner* — James Jones
(74) *Attorney, Agent, or Firm* — Bacon & Thomas, PLLC (57) ABSTRACT

The present invention provides a VCA-based lens driving device. By way of giving an improved OIS coil structure, a magnetic induction element used to sense movement of magnets atop which maybe cause from a user's hand shaking can be placed as far away from OIS coils as possible. The impact of the magnet field of the OIS coil on the magnetic induction element is thus reduced. In one embodiment, the OIS coil is down-sized to reduce the influence of the OIS coil on the magnetic induction element placed beside it. In another embodiment, the OIS coil has a one-sided indention and the magnetic induction element is placed below/or beside the indention of the OIS coil.

8 Claims, 13 Drawing Sheets

LENS DRIVING DEVICE WITH AN IMPROVED OIS COIL STRUCTURE

CROSS-REFERENCE TO RELATED APPLICATION

This application claims benefit of U.S. Provisional Patent Application No. 61/836,038, filed Jun. 17, 2013, the entire contents of which are hereby incorporated by reference.

BACKGROUND OF THE INVENTION

1. Field of the Invention

The present invention relates to a VCA-based lens driving device, and more particularly, to a lens driving device with auto-focusing and optical image stabilization mechanisms.

2. Description of the Prior Art

Figure 11:
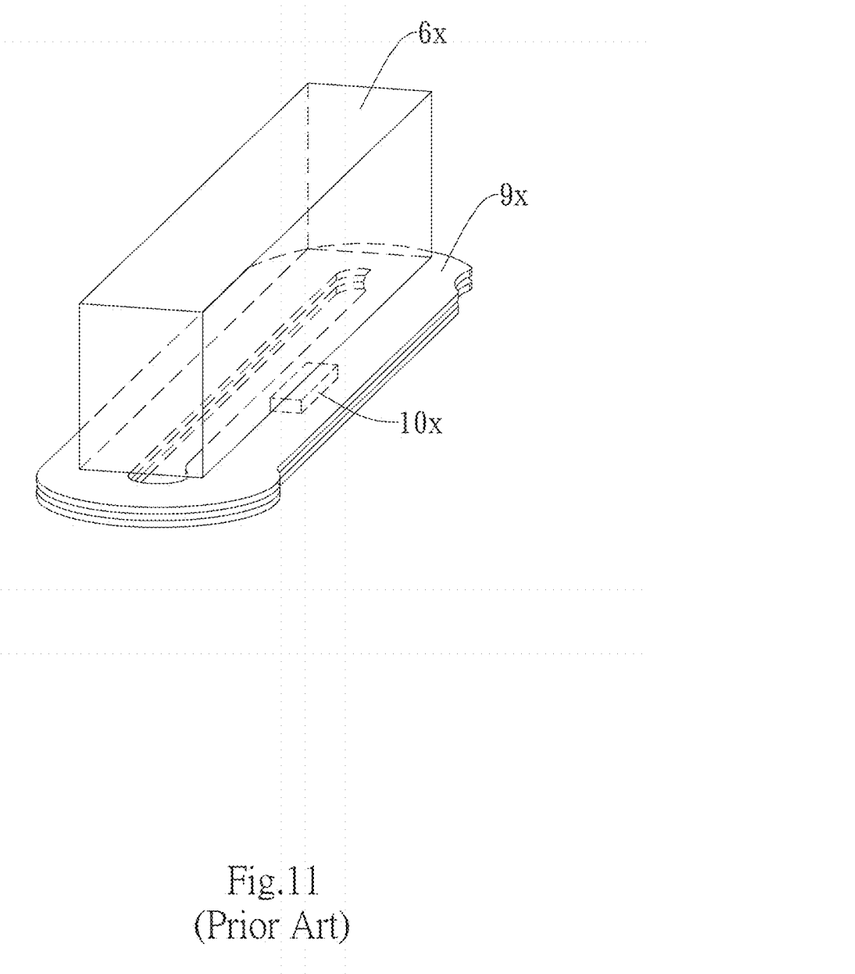
FIG. 11 is a schematic perspective view of a configuration of a Hall senor, an OIS coil and a magnet atop of the conventional lens driving device.

Conventionally, Hall sensor is used to sense movement of auto-focusing magnets (AF magnets) and optical image stabilization magnets (OIS magnets) in a photographing lens assembly with a VCA (Voice-Coil-Actuator) based lens driving device. The movement of the AF magnets and OIS magnets may be caused by a user's hand shaking during an image-capturing process. FIG. 11 shows a partial configuration of AF/OIS common magnets and OIS coils in a conventional VCA-based lens driving device, in which an X-axis OIS coil 9x is placed below a AF/OIS common magnet 6x. A Hall sensor 10x can be placed below a center hollow of the X-axis OIS coil 9x to save space. The Hall sensor 10x can sense the magnetic signal due to the movement of the magnet atop. However, the electromagnetic field of the OIS coil 9x also influences the Hall sensor 10x to cause erroneous magnet signal for the magnet movement.

Therefore, it is desirable to provide a solution to reduce the impact of the magnet field of the OIS coil on the Hall sensor.

SUMMARY OF THE INVENTION

An object of the present invention provides a VCA-based lens driving device with an improved OIS coil structure, a magnetic induction element used to sense movement of magnets atop can be placed as far away from OIS coils as possible by way of improving/modifying the OIS coil structure to reduce the impact of the magnet field of the OIS coil on the magnetic induction element.

In one embodiment, the OIS coil is down-sized to reduce the influence of the OIS coil on the magnetic induction element placed beside it. In another embodiment, the OIS coil has a one-sided indention and the magnetic induction element is placed below/or beside the indention of the OIS coil.

Therefore, in one aspect, the present invention provides a lens driving device comprising a lens assembly having an optical axis, an auto-focusing coil, an OIS coil set, a plurality of magnets and at least one magnetic induction element. The auto-focusing coil is disposed around an outer surrounding of the lens assembly with respect to the optical axis. The OIS coil set includes a plurality of OIS coils disposed on a plane perpendicular to the optical axis, wherein at least one of the OIS coils has a smaller size than the opposing OIS coil. The magnets are disposed around the outer surrounding of the lens assembly with respect to the optical axis, wherein each of the magnets has a first surface facing the auto-focusing coil and a second surface facing one of the OIS coils respectively. The magnetic induction element is placed beside the smaller-size OIS coil to sense a magnetic signal due to a displacement of the magnets. The auto-focusing coil interacts with each of the magnets along the first surface direction to drive the lens assembly and the auto-focusing coil moving together along the optical axis with respect to the magnets upon an AF electric current passing the auto-focusing coil. One of the OIS coils interacts with the second surface of the magnet correspondingly with a direction the same with the opposing OIS coil interacting with the second surface of the magnet correspondingly to drive the lens assembly, the auto-focusing coil and the magnets moving together along a direction perpendicular to the optical axis upon an OIS electric current passing the OIS coils.

Preferably, the magnetic induction element comprises a Hall sensor.

Each of the magnets can be a single piece, or optionally, each of the magnets comprises a first magnet piece facing the auto-focusing coil and a second magnet piece facing the OIS coil.

In another aspect, the present invention provides a lens assembly having an optical axis, an auto-focusing coil, an OIS coil set, a plurality of magnets and at least one magnetic induction element. The auto-focusing coil is disposed around an outer surrounding of the lens assembly with respect to the optical axis. The OIS coil set includes a plurality of OIS coils disposed on a plane perpendicular to the optical axis, wherein at least one of the OIS coils has a one-sided indention. The magnets are disposed around the outer surrounding of the lens assembly with respect to the optical axis, wherein each of the magnets has a first surface facing the auto-focusing coil and a second surface facing one of the OIS coils respectively. The magnetic induction element is placed below/or beside the indention of the OIS coil to sense a magnetic signal due to a displacement of the magnets. The auto-focusing coil interacts with each of the magnets along the first surface direction to drive the lens assembly and the auto-focusing coil moving together along the optical axis with respect to the magnets upon an AF electric current passing the auto-focusing coil. One of the OIS coils interacts with the second surface of the magnet correspondingly with a direction the same with the opposing OIS coil interacting with the second surface of the magnet correspondingly to drive the lens assembly, the auto-focusing coil and the magnets moving together along a direction perpendicular to the optical axis upon an OIS electric current passing the OIS coils.

Preferably, the magnetic induction element comprises a Hall sensor.

Each of the magnets can be a single piece, or optionally, each of the magnets comprises a first magnet piece facing the auto-focusing coil and a second magnet piece facing the OIS coil.

DETAILED DESCRIPTION OF THE PREFERRED EMBODIMENTS

The present invention now will be described more fully hereinafter with reference to the accompanying drawings, in which preferred embodiments of the present invention are shown.

Figure 1:
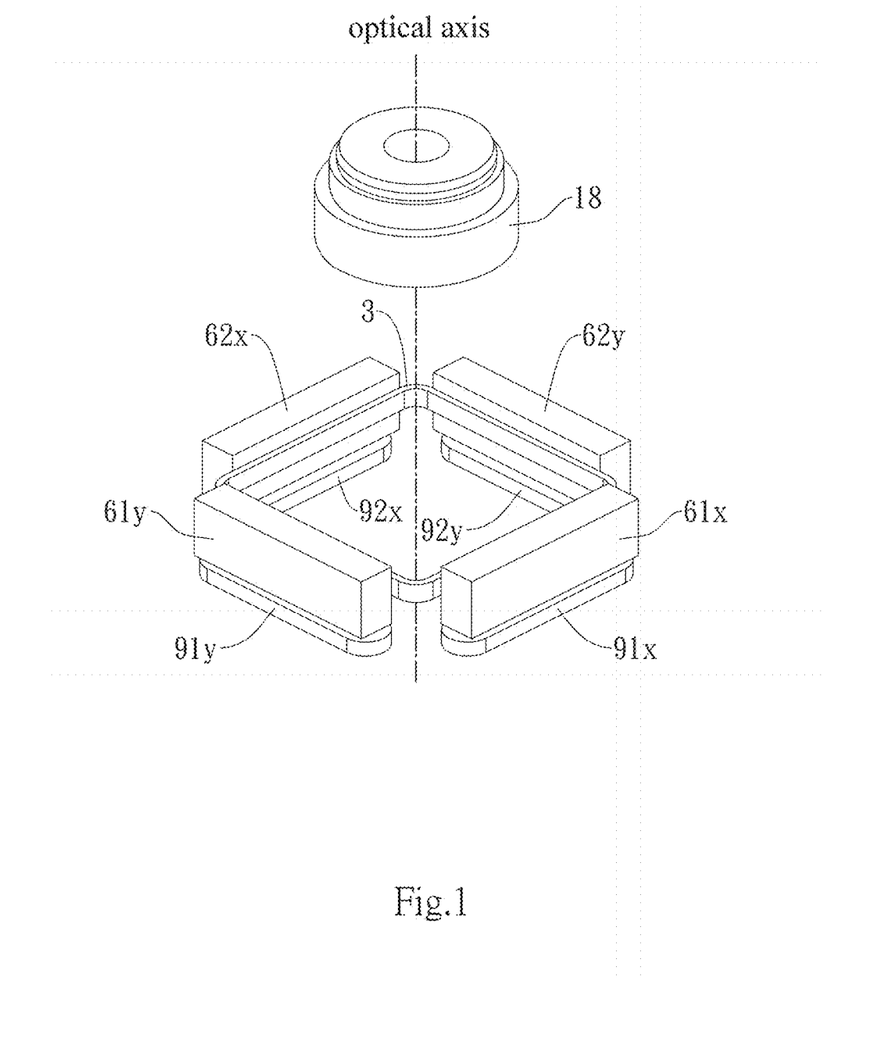
FIG. 1 is a schematic perspective view of a lens driving device realized by a common magnet VCA scheme of the present invention.
Figure 2:
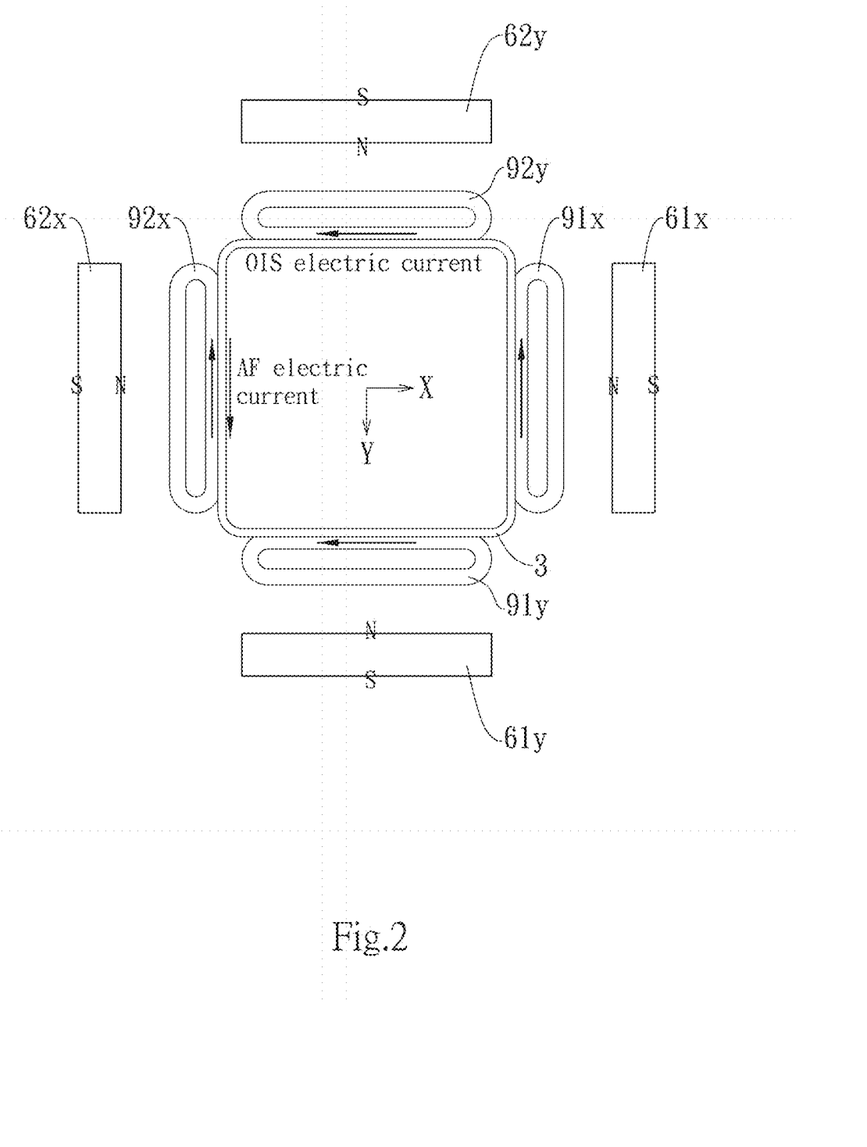
FIG. 2 is a schematic top exploded view of FIG. 1, illustrating a magnetic field distribution in the structure of FIG. 1.

The present lens driving device is based on a Voice Coil Actuator structure and provides auto-focusing and optical image stabilization (OIS) functions. The two functions can be realized by a common magnet scheme or a separate magnet scheme. FIG. 1 illustrates a schematic perspective view of the present lens driving device with the common magnet scheme, in which upper and lower spring plates are omitted for clearly showing arrangement of AF coil, OIS coils and magnets. FIG. 2 is a schematic top exploded view without the lens assembly of FIG. 1, and illustrating a magnetic field distribution in the structure of FIG. 1. As shown in FIG. 1, the present lens driving device mainly comprises a lens assembly 18 having an optical axis, an auto-focusing coil (AF coil) 3, an OIS coil set, and a plurality of magnets 61x, 61y, 62x, 62y. In the present invention, a Z-axis is defined as the optical axis. The AF coil 3 and the magnets 61x, 61y, 62x, 62y are disposed around an outer surrounding of the lens assembly 18 with respect to the optical axis. The OIS coil set includes a plurality of OIS coils 91x, 91y, 92x, 92y that are disposed on a plane perpendicular to the optical axis. Each of the magnets 61x, 61y, 62x, 62y has an inner N pole and an outer S pole. The AF coil 3 and OIS coil set share the common magnet composed of the magnets 61x, 61y, 62x, 62y. Each of the magnets 61x, 61y, 62x, 62y has a first surface and a second surface. The first surface of each of the magnets 61x, 61y, 62x, 62y faces the AF coil 3 and the second surface of each of the magnets 61x, 61y, 62x, 62y faces one of the OIS coils 91x, 91y, 92x, 92y, respectively, so that the OIS coils 91x, 91y, 92x, 92y are disposed under the magnets 61x, 61y, 62x, 62y. Electromagnetic driving force is generated in the AF coil 3 by AF electric current and the common magnet to perform auto-focusing function. Electromagnetic driving force is generated in the OIS coil set by OIS electric current and the common magnet to perform the OIS function (i.e. anti-shaking function). Specifically, the AF coil 3 interacts with the first surface of each of the magnets 61x, 61y, 62x, 62y, whereby the AF coil 3 and the lens assembly can move along the optical axis with respect to the magnets 61x, 61y, 62x, 62y to perform the auto-focusing function. A direction of the OIS coil 91x interacting with the second surface of the magnet 61x is the same with that of the OIS coil 92x interacting with the second surface of the magnet 62x. A direction of the OIS coil 91y interacting with the second surface of the magnet 61y is the same with that of the OIS coil 92y interacting with the second surface of the magnet 62y. The lens assembly 18, AF coil 3 and the magnets 61x, 61y, 62x, 62y thus can move along directions (i.e. X-axis direction and/or Y-axis direction) perpendicular to the optical axis with respect to the OIS coils 91x, 91y, 92x, 92y to perform the OIS function (i.e. anti-shaking function).

Figure 3:
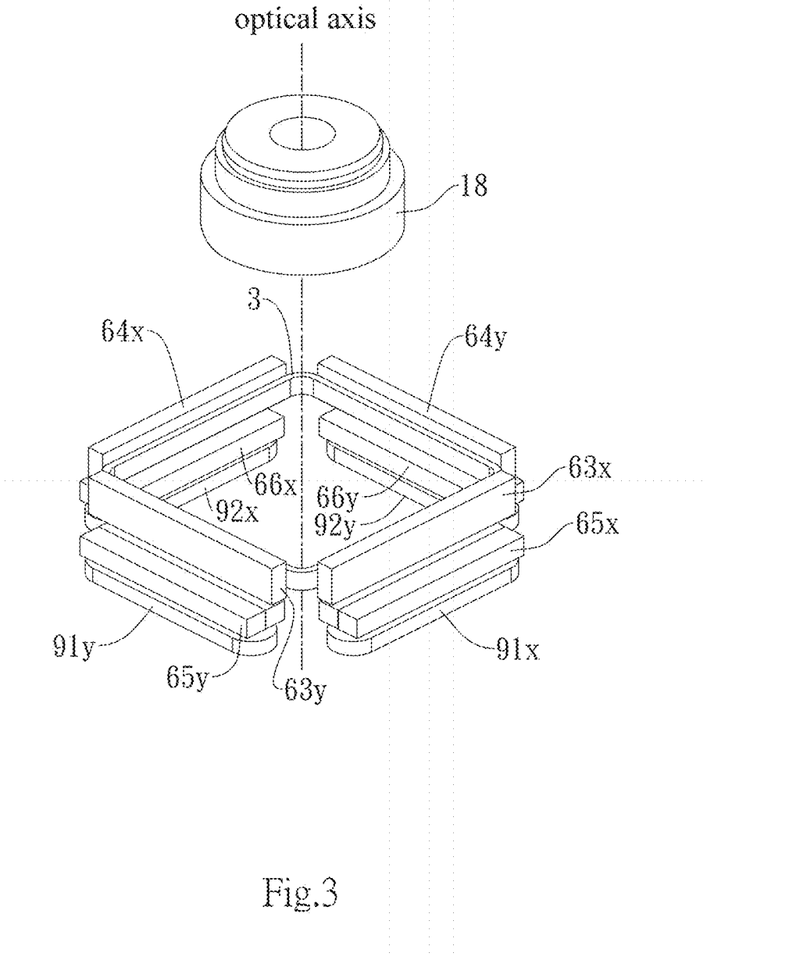
FIG. 3 is a schematic perspective view of a lens driving device realized by a separate magnet VCA scheme of the present invention.
Figure 4:
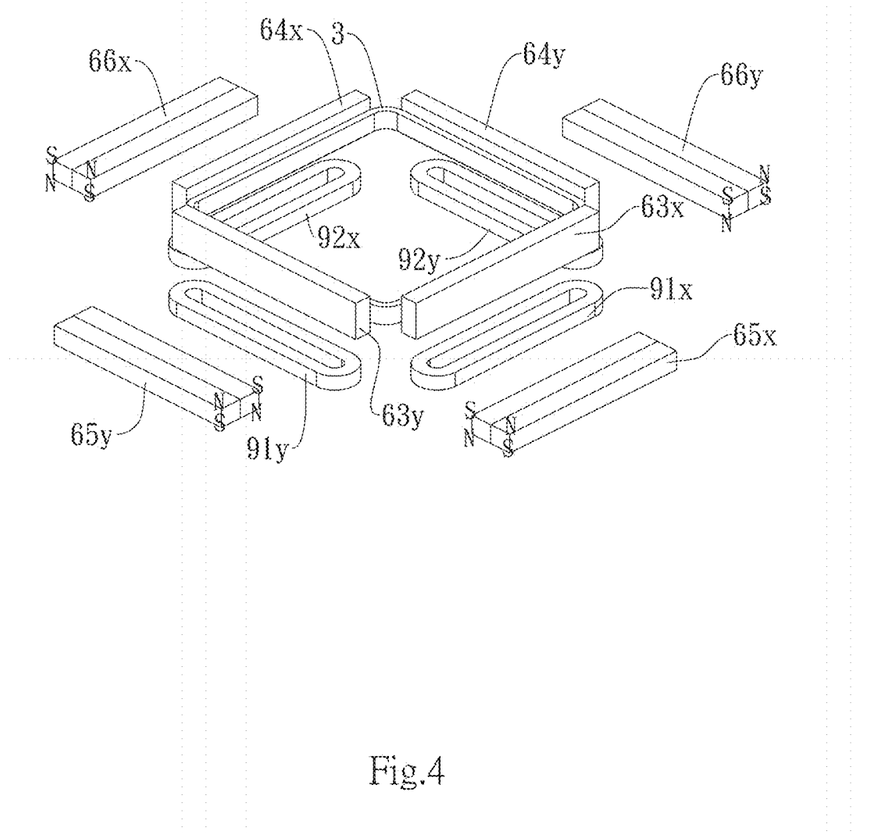
FIG. 4 is a schematic top exploded view of FIG. 3.
Figure 5:
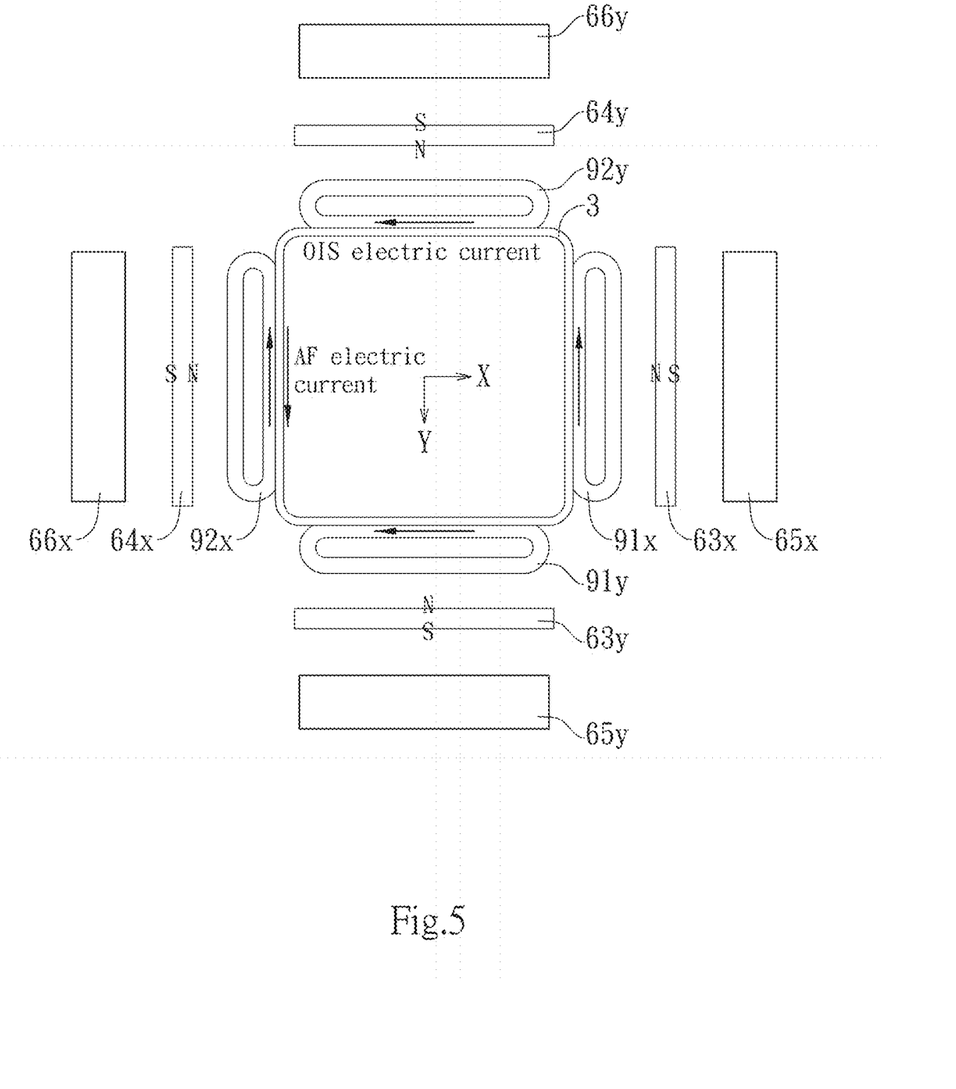
FIG. 5 is a schematic top view of FIG. 4 and illustrating a magnetic field distribution in the structure of FIG. 3.
Figure 6:
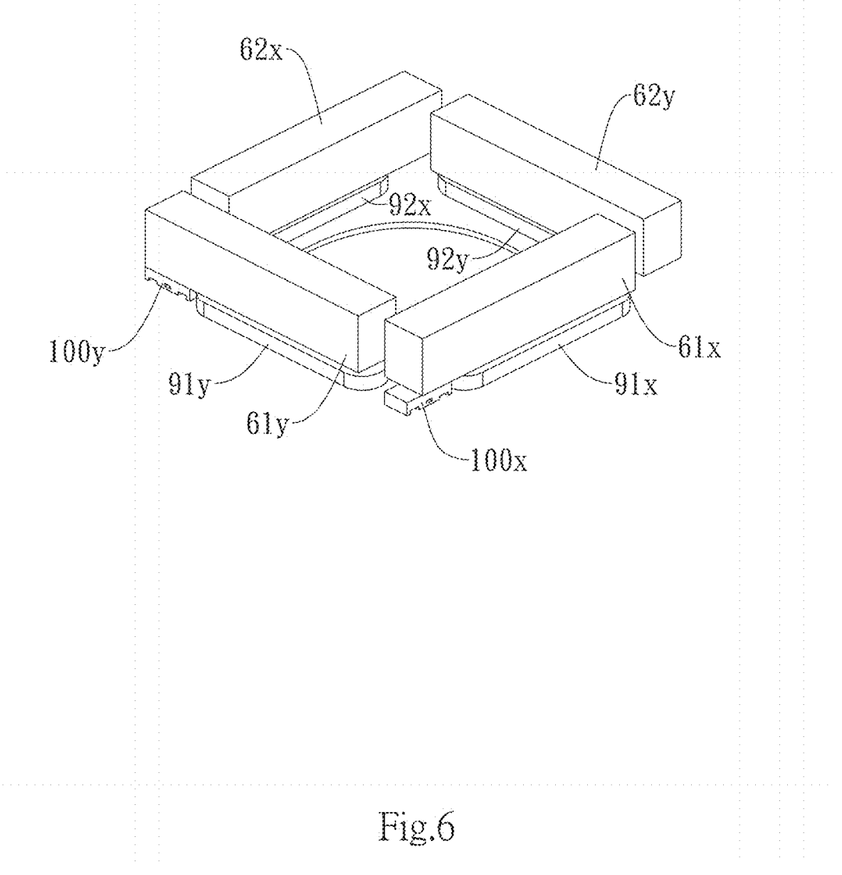
FIG. 6 is a schematic perspective view of a lens driving device with an improved OIS coil structure according to a first embodiment of the present invention.
Figure 7:
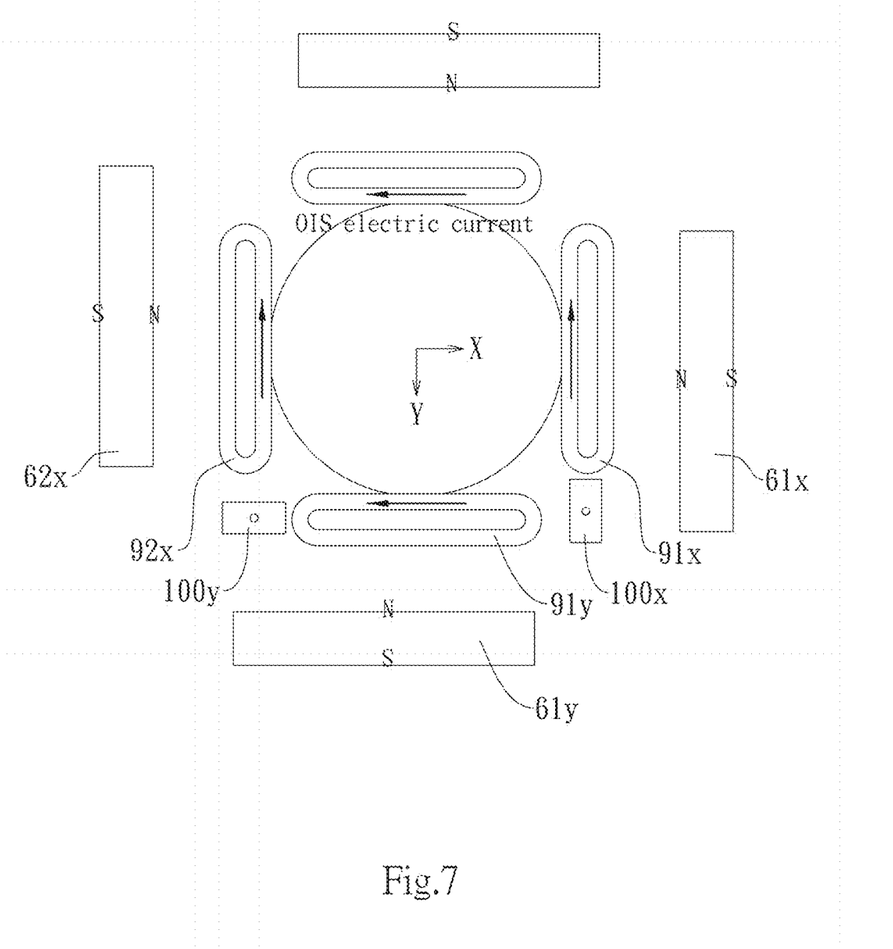
FIG. 7 is a schematic top exploded view of FIG. 6, illustrating a magnetic field distribution in the structure of FIG. 6.
Figure 8:
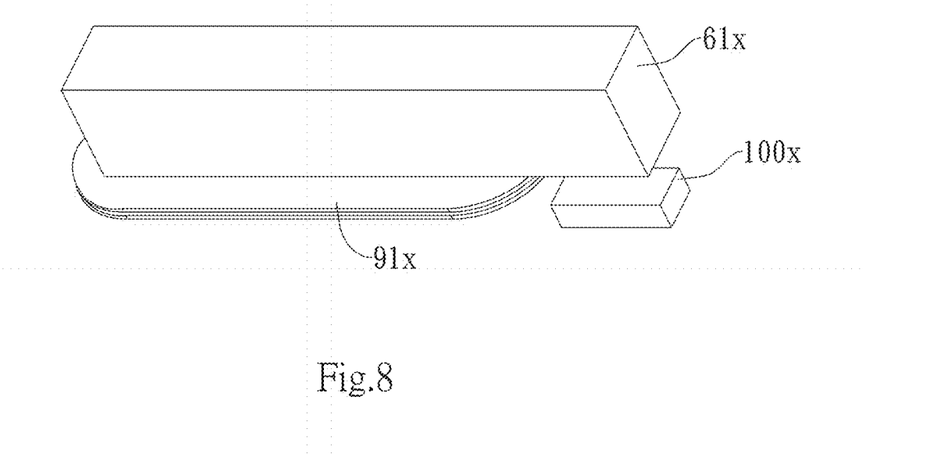
FIG. 8 is a schematic perspective view of a configuration of a X-axis Hall sensor, X-axis OIS coil and a X-axis magnet atop of the first embodiment of FIG. 6.
Figure 9:
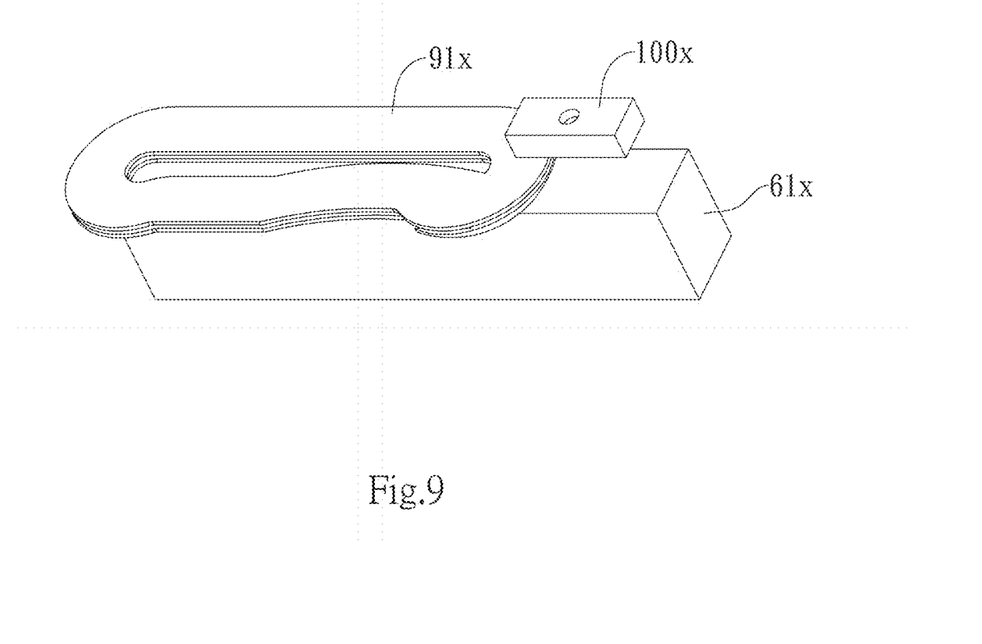
FIG. 9 is a schematic bottom perspective view of FIG. 8.

FIG. 3 illustrates a schematic perspective view of the present lens driving device with the separate magnet scheme, in which upper and lower spring plates are omitted for clearly showing arrangement of AF coil, OIS coils and magnets. FIG. 4 is a schematic top exploded view without the lens assembly of FIG. 3. FIG. 5 is a schematic top view of FIG. 4 and illustrating a magnetic field distribution in the structure of FIG. 3. As shown in FIG. 3, the present lens driving device mainly comprises a lens assembly 18 having an optical axis, an auto-focusing coil (AF coil) 3, an OIS coil set, a plurality of AF magnets 63x, 63y, 64x, 64y and a plurality of OIS magnets 65x, 65y, 66x, 66y. The AF coil 3, AF magnets 63x, 63y, 64x, 64y and the OIS magnets 65x, 65y, 66x, 66y are disposed around an outer surrounding of the lens assembly 18 with respect to the optical axis. The OIS magnets 65x, 65y, 66x, 66y are positioned below the AF magnets 63x, 63y, 64x, 64y. The OIS coil set includes a plurality of OIS coils 91x, 91y, 92x, 92y that are disposed on a plane perpendicular to the optical axis and under the OIS magnets 65x, 65y, 66x, 66y. The OIS coils 91x, 91y, 92x, 92y sequentially face the OIS magnets 65x, 65y, 66x, 66y. Each of the AF magnets 63x, 63y, 64x, 64y has an inner N pole and an outer S pole. Electromagnetic driving force is generated in the AF coil 3 by AF electric current and the AF magnets 63x, 63y, 64x, 64y to perform auto-focusing function. Electromagnetic driving force is generated in the OIS coil set by OIS electric current and the OIS magnets 65x, 65y, 66x, 66y to perform the OIS function (i.e. anti-shaking function). Specifically, the AF coil 3 interacts with each of the AF magnets 63x, 63y, 64x, 64y, whereby the AF coil 3 and the lens assembly 18 can move along the optical axis with respect to the AF magnets 63x, 63y, 64x, 64y to perform the auto-focusing function. A direction of the OIS coil 91x interacting with the OIS magnet 65x is the same with that of the OIS coil 92x interacting with the OIS magnet 66x. A direction of the OIS coil 91y interacting with the OIS magnet 65y is the same with that of the OIS coil 92y interacting with the OIS magnet 66y. The lens assembly 18, the AF coil 3, AF magnets 63x, 63y, 64x, 64y and the OIS magnets 65x, 65y, 66x, 66y thus can move along directions (i.e. X-axis direction and/or Y-axis direction) perpendicular to the optical axis with respect to the OIS coils 91x, 91y, 92x, 92y to perform the OIS function (i.e. anti-shaking function).

Figure 10:
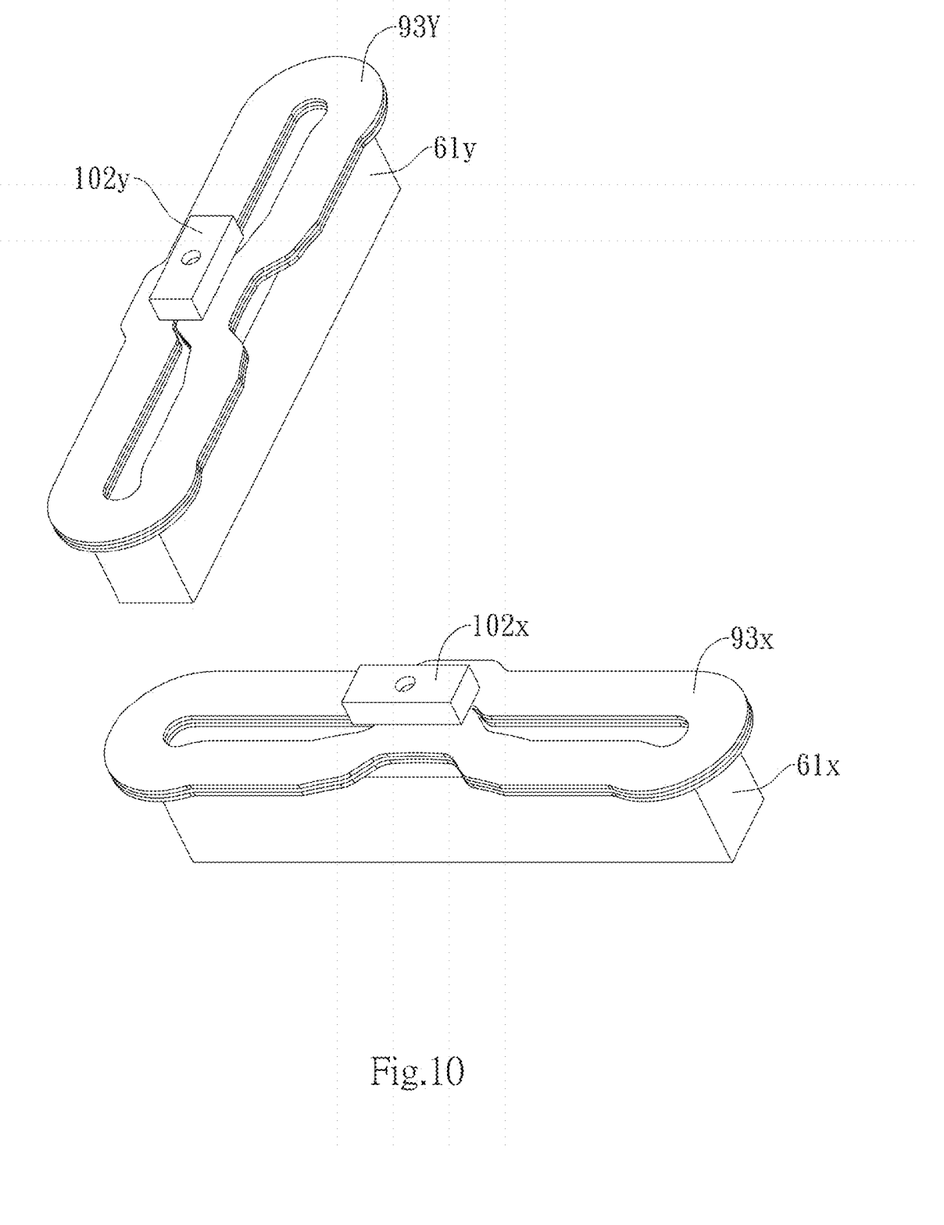
FIG. 10 is a schematic bottom perspective view of a configuration of a X-axis Hall sensor, X-axis OIS coil and a X-axis magnet atop according to a second embodiment of the present invention.

The present lens driving device further comprises magnetic induction elements for example Hall sensors to sense the magnetic signal due to the movement of the magnets atop which may be caused by a user's hand shaking. The electromagnetic field of the OIS coil may influence the Hall sensor to cause erroneous magnet signal for the magnet movement. The present invention provides two embodiments to make the Hall sensor as far away from the OIS coil as possible to reduce the impact of the magnet field of the OIS coil on the Hall sensor. A description of the two embodiments is given with the common magnet scheme of FIG. 1 in the following. FIG. 6 through FIG. 9 shows a first embodiment, in which the OIS coils 91x, 91y are down-sized than the other OIS coils 92x, 92y, a Hall sensor 100x and a Hall sensor 100y are respectively placed beside one side of the OIS coils 91x, 91y. Please note that the AF coil 3 is omitted from FIG. 6 through FIG. 9. The Hall sensor 100x sense a displacement of the magnets 61x, 62x. The Hall sensor 100y senses a displacement of the magnets 61y, 62y. In the configuration of the first embodiment, the Hall sensors 100x, 100y can be totally prevented from the interference of the OIS coils 91x, 91y. FIG. 10 is a schematic bottom perspective view of an arrangement of the magnet 61x, OIS coil 93x and a Hall sensor 102x, as well as the magnet 61y, OIS coil 93y and a Hall sensor 102y according to a second embodiment of the present invention. The Hall sensor 102x senses a displacement of the magnets 61x, 62x. The OIS coil 93x has a single-sided indention in its middle portion. The Hall sensor 102x is placed below the indention of the OIS coil 93x to reduce the influence of the OIS coil 93x magnet field on the Hall sensor 102x, while the electromagnetic effect between the OIS coil 93x and the magnet 61x is not influenced. Alternatively, the Hall sensor 102x can be placed beside the indention of the OIS coil 93x. In the second embodiment, for sensing a displacement of the magnets 61y, 62y, a configuration and structure of a Y-axis Hall sensor 102y, a Y-axis OIS coil 93y and the magnet 61y are the same with that of the Hall sensor 102x, OIS coil 93x and the magnet 61x. In other words, the Y-axis OIS coil 93y has a single-sided indention in its middle portion. The Y-axis Hall sensor 102y is placed below/or beside the indention of the Y-axis OIS coil 93y.

Please note other magnetic induction element can be used instead of the Hall sensor to sense the movement of the magnets atop in the above two embodiments. The lens driving device with the separate magnet scheme as shown in FIG. 3 also can be implemented in the above two embodiments to replace the lens driving device with the common magnet scheme.

Figure 12:
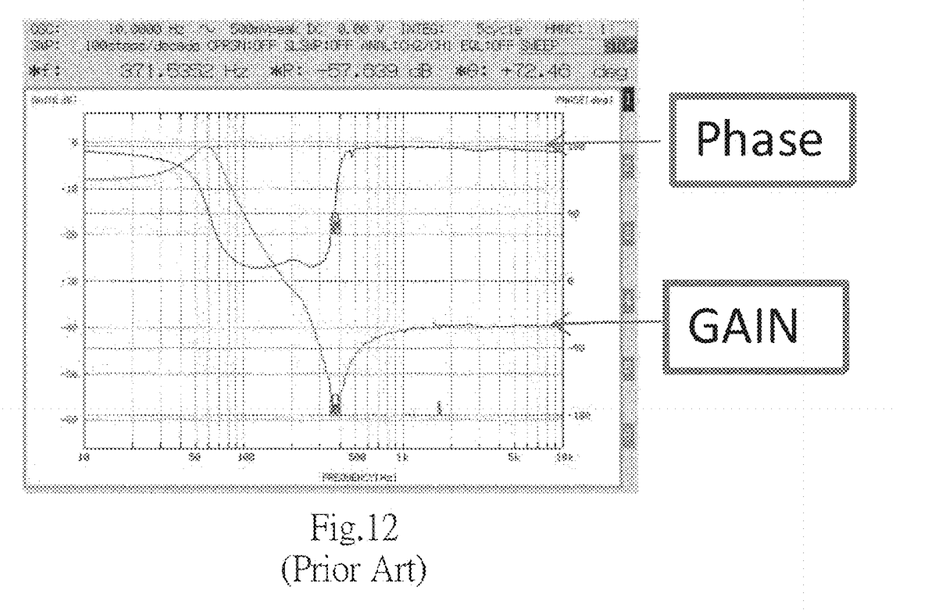
FIG. 12 shows Hall sensor effect of FIG. 11.
Figure 13A:
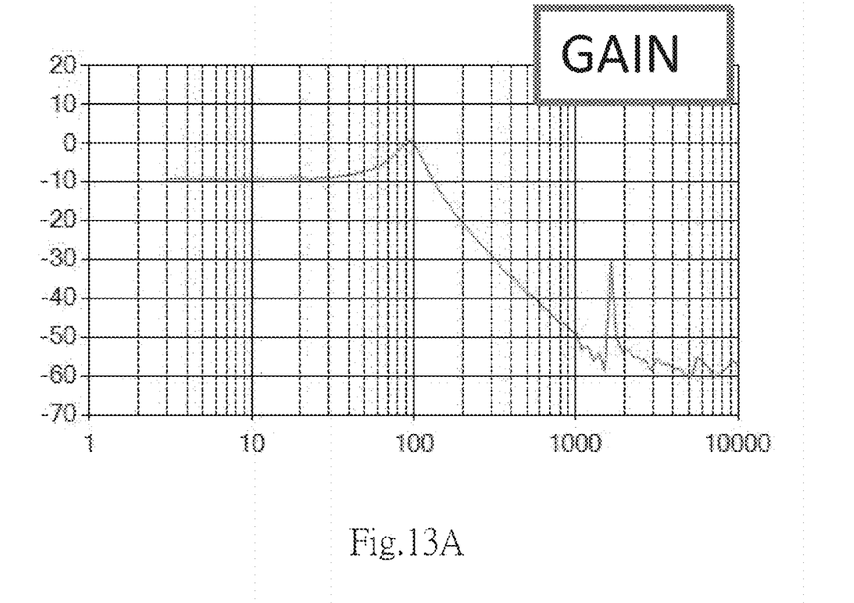
FIG. 13A shows a diagram of gain value vs. frequency of the Hall sensor of FIG. 6.
Figure 13B:
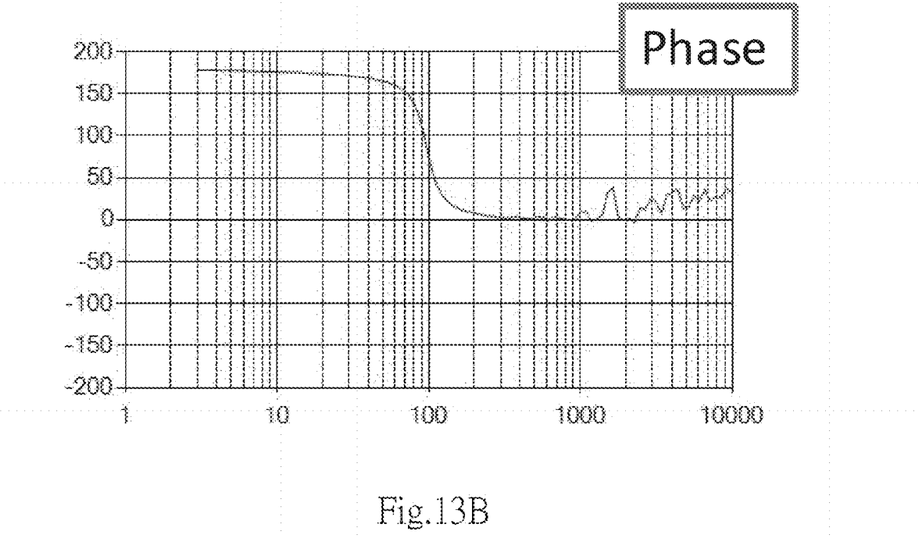
FIG. 13B shows a diagram of phase vs. frequency of the Hall sensor of FIG. 6.
Figure 14A:
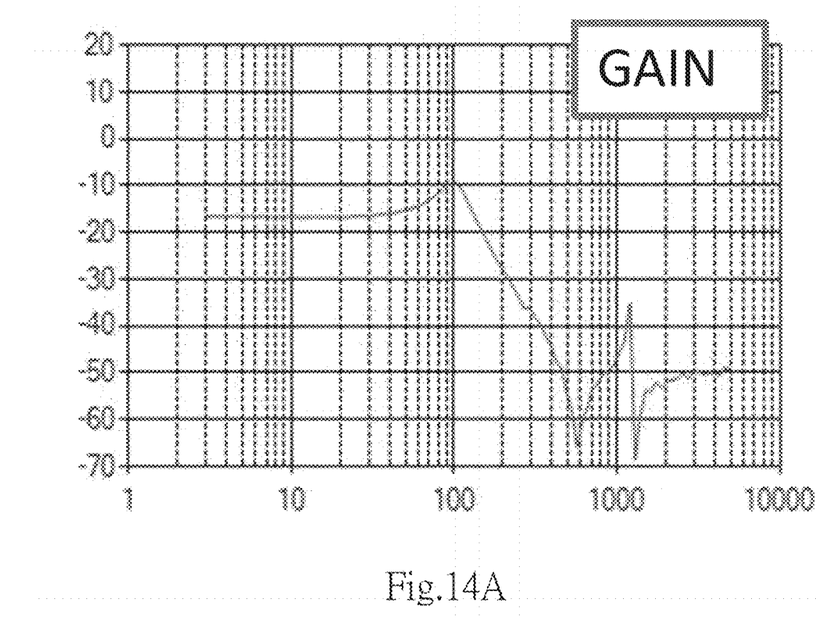
FIG. 14A shows a diagram of gain value vs. frequency of the Hall sensor of FIG. 10.
Figure 14B:
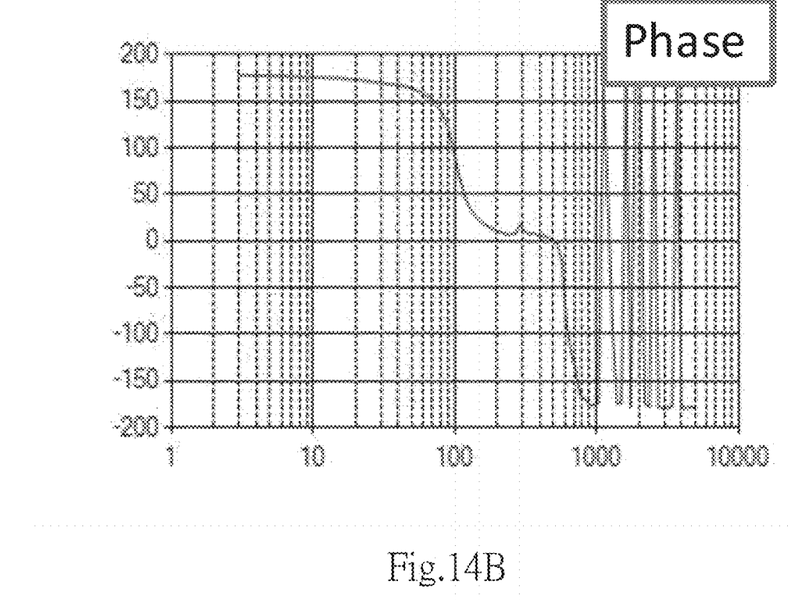
FIG. 14B shows a diagram of phase vs. frequency of the Hall sensor of FIG. 10.

FIG. 12 through FIG. 14 respectively shows Hall sensor effect in the conventional configuration of Hall sensor-OIS coil-magnet atop of FIG. 11 and the present two embodiments. FIG. 12 shows Hall sensor effect of FIG. 11, in which a gain value of the Hall sensor 10x abruptly decreases to −60 dB at about 300 Hz frequency, then the gain increases to −40 dB and maintains at this gain value. A phase of the Hall sensor 10x also reverses at 300 Hz frequency. The occurrence of abrupt decrease of the gain value and reversing of the phase at 300 Hz frequency represents the impact of the magnetic field of the OIS coil 9x on the Hall sensor 10x is significant. FIG. 13A shows a diagram of gain value vs. frequency of the Hall sensor 100x (and 100y) of the first embodiment of FIG. 6, and FIG. 13B shows a diagram of phase vs. frequency of the Hall sensor 100x (and 100y). As in FIG. 13A, a gain value of the Hall sensor 100x (and 100y) gradually decreases at a constant slope rate, and reducing 40 dB from 90 Hz frequency to 1000 Hz frequency. The phase of the Hall sensor 100x (and 100y) does not change during the aforesaid frequency range as in FIG. 13B. It means that the impact of the magnetic field of the OIS coil 91x (and 91y) on the Hall sensor 100x (and 100y) is significantly reduced. FIG. 14A shows a diagram of gain value vs. frequency of the Hall sensor 102x (and 102y) of the second embodiment of FIG. 10, and FIG. 14B shows a diagram of phase vs. frequency of the Hall sensor 102x (and 102y). A decrease of gain value of the Hall sensor 102x (and 102y) is delayed to more than 500 Hz frequency and phase reverse happens at 1000 Hz frequency. The abrupt decrease of the gain value and phase reverse occur at higher frequency means the impact of the magnetic field of the OIS coil at the Hall sensor is weaker, and it is desirable for the design of the configuration of the OIS coil and Hall sensor of the present invention. Please note that the X-axis shows gain value in unit of dB and the Y-axis shows frequency in unit of Hz from FIG. 12 through FIG. 14. It can be seen from FIG. 12 through FIG. 14 that the improved OIS coil structures of the present two embodiments can significantly reduce the impact of the magnet field of the OIS coil on the Hall sensor than the conventional OIS coil structure shown in FIG. 11. In the present lens driving device, the Hall sensor can more exactly sense displacements of the magnets atop to effectively perform the OIS function so as to assure a good quality of an image captured by the present lens assembly.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that structures within the scope of these claims and their equivalents be covered thereby.

What is claimed is:

1. A lens driving device, comprising:
   a lens assembly having an optical axis;
   an auto-focusing coil disposed around an outer surrounding of the lens assembly with respect to the optical axis;
   an OIS coil set including a plurality of OIS coils disposed on a plane perpendicular to the optical axis, wherein at least one of the OIS coils has a smaller size than the opposing OIS coil;
   a plurality of magnets disposed around the outer surrounding of the lens assembly with respect to the optical axis, wherein each of the magnets has a first surface facing the auto-focusing coil and a second surface facing one of the OIS coils respectively; and
   at least one magnetic induction element placed beside the smaller-size OIS coil to sense a magnetic signal due to a displacement of the magnets;
   wherein the auto-focusing coil interacts with each of the magnets along the first surface direction to drive the lens assembly and the auto-focusing coil moving together along the optical axis with respect to the magnets upon an AF electric current passing the auto-focusing coil;
   wherein one of the OIS coils interacts with the second surface of the magnet correspondingly with a direction the same with the opposing OIS coil interacting with the second surface of the magnet correspondingly to drive the lens assembly, the auto-focusing coil and the magnets moving together along a direction perpendicular to the optical axis upon an OIS electric current passing the OIS coils;
   wherein the first surface is parallel to the optical axis and the second surface is perpendicular to the optical axis.

2. The lens driving device of claim 1, wherein the magnetic induction element comprises at least one Hall sensor.

3. The lens driving device of claim 1, wherein each of the magnets comprises a first magnet piece facing the auto-focusing coil and a second magnet piece facing the OIS coil.

4. The lens driving device of claim 2, wherein each of the magnets comprises a first magnet piece facing the auto-focusing coil and a second magnet piece facing the OIS coil.

5. A lens driving device, comprising:
   a lens assembly having an optical axis;
   an auto-focusing coil disposed around an outer surrounding of the lens assembly with respect to the optical axis;
   an OIS coil set including a plurality of OIS coils disposed on a plane perpendicular to the optical axis, wherein at least one of the OIS coils has a one-sided indention;

a plurality of magnets disposed around the outer surrounding of the lens assembly with respect to the optical axis, wherein each of the magnets has a first surface facing the auto-focusing coil and a second surface facing one of the OIS coils respectively; and at least one magnetic induction element placed beside/or below the indention of the OIS coil to sense a magnetic signal due to a displacement of the magnets;

wherein the auto-focusing coil interacts with each of the magnets along the first surface direction to drive the lens assembly and the auto-focusing coil moving together along the optical axis with respect to the magnets upon an AF electric current passing the auto-focusing coil;

wherein one of the OIS coils interacts with the second surface of the magnet correspondingly with a direction the same with the opposing OIS coil interacting with the second surface of the magnet correspondingly to drive the lens assembly, the auto-focusing coil and the magnets moving together along a direction perpendicular to the optical axis upon an OIS electric current passing the OIS coils;

wherein the first surface is parallel to the optical axis and the second surface is perpendicular to the optical axis.

6. The lens driving device of claim 5, wherein the magnetic induction element comprises at least one Hall sensor.

7. The lens driving device of claim 5, wherein each of the magnets comprises a first magnet piece facing the auto-focusing coil and a second magnet piece facing the OIS coil.

8. The lens driving device of claim 6, wherein each of the magnets comprises a first magnet piece facing the auto-focusing coil and a second magnet piece facing the OIS coil.

* * * * *